United States Patent
Won

(10) Patent No.: US 9,001,344 B2
(45) Date of Patent: Apr. 7, 2015

(54) IMAGE FORMING APPARATUS, METHOD OF CONTROL THEREOF AND COMPUTER READABLE MEDIUM

(71) Applicant: Samsung Electronics Co., Ltd., Suwon-si, Gyeonggi-do (KR)

(72) Inventor: Tae-hee Won, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 14/154,416

(22) Filed: Jan. 14, 2014

(65) Prior Publication Data

US 2014/0198333 A1 Jul. 17, 2014

(30) Foreign Application Priority Data

Jan. 14, 2013 (KR) ........................ 10-2013-0004058

(51) Int. Cl.
*G06F 15/00* (2006.01)
*G06F 3/12* (2006.01)
*G06K 1/00* (2006.01)
*H04N 1/00* (2006.01)
*G06K 15/00* (2006.01)

(52) U.S. Cl.
CPC ........ *H04N 1/00896* (2013.01); *G06K 15/4055* (2013.01); *H04N 1/00954* (2013.01); *H04N 2201/0093* (2013.01); *H04N 2201/0094* (2013.01); *H04N 2201/0091* (2013.01); *H04N 2201/0082* (2013.01)

(58) Field of Classification Search
CPC .......... H04N 1/00896; H04N 1/00954; H04N 2201/0093; H04N 2201/0094; H04N 2201/0091; H04N 2201/0082; G06K 15/4055
USPC ................................ 358/1.1, 1.13, 1.15, 1.14
See application file for complete search history.

(56) References Cited

U.S. PATENT DOCUMENTS 6,493,100 B1 * 12/2002 Endo et al. .................... 358/1.14
2011/0150518 A1 * 6/2011 Hase et al. ...................... 399/70

* cited by examiner

*Primary Examiner* — Douglas Tran
(74) *Attorney, Agent, or Firm* — Staas & Halsey LLP

(57) ABSTRACT

An image forming apparatus and a control method are provided. The image forming apparatus includes an input which receives an input of a job execute command, a job performer which performs a job according to the inputted job execute command, and a controller which adjusts a standby time, when the inputted job execute command is added during operation in the normal mode, the standby time being time interval between completion of the job and entrance into power-save mode. The controller changes the operational mode of the image forming apparatus to the power-save mode according to the adjusted standby time.

20 Claims, 11 Drawing Sheets

IMAGE FORMING APPARATUS, METHOD OF CONTROL THEREOF AND COMPUTER READABLE MEDIUM

CROSS-REFERENCE TO RELATED APPLICATIONS

This application claims priority from Korean Patent Application No. 10-2013-0004058, filed on Jan. 14, 2013 in the Korean Intellectual Property Office, the disclosure of which is incorporated herein by reference in its entirety.

BACKGROUND

1. Field

The present disclosure relates to an image forming apparatus and a control method thereof, and more particularly, to an image forming apparatus which variably applies power-save mode entering time of the image forming apparatus according to use by a user, a control method and a computer readable medium.

2. Description of the Related Art

An image forming apparatus prints print data generated at a terminal apparatus such as a computer onto a printing medium. An example of the image forming apparatus includes a copier, a printer, a facsimile, or a multi function peripheral (MFP) integrating the functions of those mentioned above.

Meanwhile, for preventing unnecessary power consumption, the image forming apparatus is turned from a standby mode to a power-save mode when it is kept being on without being used for a predetermined time. In power-save mode, operation of user interface (UI) may be stopped, or clock speed of the CPU may be slowed down to reduce power consumption.

However, since the time to be elapsed until power-save mode (or standby time) is generally preset by a user or a manufacturer, inefficiency may be generated depending on the user's pattern of using the apparatus or a specific circumstance. To be specific, since wake-up time is consumed when the power-save mode is changed to normal mode, it can be inefficient when the relatively short time is set to be elapsed before entering power-save mode as the power-save mode is entered frequently, thus increasing waiting time. On the other hand, if the time set to be elapsed before entering power-save mode is too long, power-save mode is barely entered and the purpose of power saving is not met.

SUMMARY

Additional aspects and/or advantages will be set forth in part in the description which follows and, in part, will be apparent from the description, or may be learned by practice of the invention.

Exemplary embodiments overcome the above disadvantages and other disadvantages not described above. Also, the present inventive concept is not required to overcome the disadvantages described above, and an exemplary embodiment of the present inventive concept may not overcome any of the problems described above.

According to an embodiment, a technical objective is to provide an image forming apparatus, a control method and a computer readable medium, which variably apply time to be elapsed until entering power-save mode according to use of a printer by a user, thereby providing efficient power consumption management and also enhanced user convenience.

In one embodiment, a control method of an image forming apparatus having a normal mode and a power-save mode is provided, which may include inputting a job execute command, performing a job according to the inputted job execute command, adjusting a standby time, when the inputted job execute command is added during operation in the normal mode, the standby time being time interval between completion of the job and entrance into power-save mode, and changing the operational mode of the image forming apparatus to the power-save mode according to the adjusted standby time.

The adjusting may include increasing the standby time according to an accumulative number of job execute commands which are added during operation of the image forming apparatus in the normal mode.

The control method may additionally include inputting a set value of the accumulative number of job execute commands as added, in which the adjusting may include increasing the standby time each time the accumulative number of job execute commands as added reaches a multiple of the set value.

The control method may additionally include inputting a minimum value and a maximum value of the standby time, in which the adjusting may include adjusting the standby time between the minimum value and the maximum value.

The control method may additionally include setting the minimum value as an initial value of the standby time, when the image forming apparatus changes from the power-save mode to the normal mode.

The adjusting comp may include adjusting the standby time according to a number of pages printed according to the job execute command as added.

The normal mode may include an operational mode to perform a print job and a standby mode to stand by for the print job.

The job execute command may include at least one of a scan command, a copy command, a fax command and a print command.

The power-save mode may include saving power by cutting off power supply to a module in need of power save, or reducing clock speed of the module in need of power save.

In one embodiment, an image forming apparatus having a normal mode and a power-save mode is provided, which may include an input which receives an input of a job execute command, a job performer which performs a job according to the inputted job execute command, and a controller which adjusts a standby time, when the inputted job execute command is added during operation in the normal mode, the standby time being time interval between completion of the job and entrance into power-save mode, in which the controller may change the operational mode of the image forming apparatus to the power-save mode according to the adjusted standby time.

The controller may increase the standby time according to an accumulative number of job execute commands which are added during operation of the image forming apparatus in the normal mode.

The input may receive an input of a set value of the accumulative number of job execute commands as added, and the controller may increase the standby time each time the accumulative number of job execute commands as added reaches a multiple of the set value.

The input may receive an input of a minimum value and a maximum value of the standby time, and the controller may adjust the standby time between the minimum value and the maximum value.

The controller may set the minimum value as an initial value of the standby time, when the image forming apparatus changes from the power-save mode to the normal mode.

The controller may adjust the standby time according to a number of pages printed according to the job execute command as added.

The normal mode may include an operational mode to perform a print job and a standby mode to stand by for the print job.

The job execute command may include at least one of a scan command, a copy command, a fax command and a print command.

The controller may save power by cutting off power supply to a module in need of power save, or reducing clock speed of the module in need of power save, when the operation changes to the power-save mode.

In one embodiment, a computer-readable recording medium comprising a program to implement a control method of an image forming apparatus having a normal mode and a power-save mode is provided, which may include inputting a job execute command, performing a job according to the inputted job execute command, adjusting a standby time, when the inputted job execute command is added during operation in the normal mode, the standby time being time interval between completion of the job and entrance into power-save mode, and changing the operational mode of the image forming apparatus to the power-save mode according to the adjusted standby time.

BRIEF DESCRIPTION OF THE DRAWINGS

The above and/or other aspects will be more apparent by describing certain exemplary embodiments of the present inventive concept with reference to the accompanying drawings, in which.

DETAILED DESCRIPTION

Figure 1:
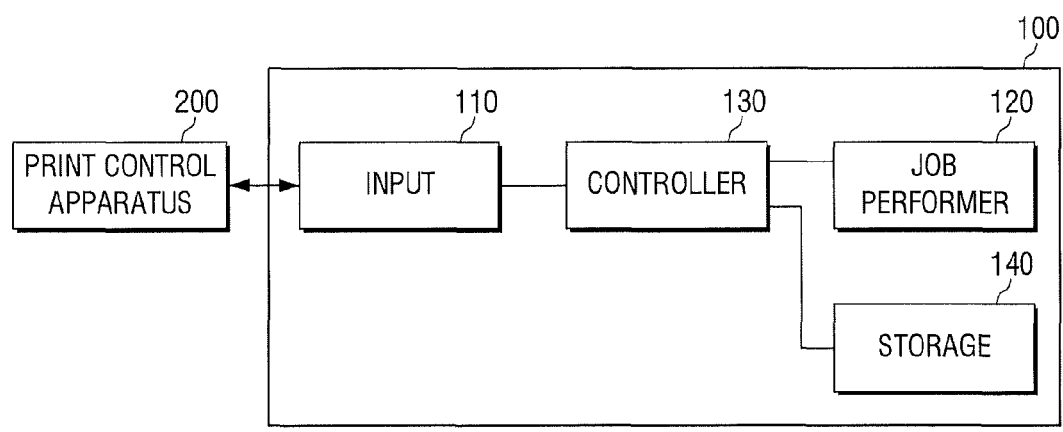
FIG. 1 is a block diagram of an image forming apparatus according to an embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present disclosure. Accordingly, it is apparent that the exemplary embodiments can be carried out without those specifically defined matters. Also, well-known functions or constructions are not described in detail since they would obscure the invention with unnecessary detail.

FIG. 1 is a block diagram of an image forming apparatus according to an embodiment.

Referring to FIG. 1, the image forming apparatus 100 includes an input 110, a job performer 120, a controller 130, and a storage 140.

The image forming apparatus in one embodiment may have several different operation modes depending on the operational status of the apparatus. In one embodiment, the operational mode of the image forming apparatus 100 may be divided into a normal mode and a power-save mode.

The 'power-save mode' as used herein refers to an operational mode to prevent unnecessary consumption of electricity by cutting off power supply to a module in need of power save of the image forming apparatus 100 or reducing clock speed, when the image forming apparatus is not used for a predetermined time. Meanwhile, although the image forming apparatus is explained as having only one power-save mode, in another embodiment, the image forming apparatus may have a plurality of power-save modes when actually implemented.

Meanwhile, the normal mode is the operational mode distinguished from the power-save mode, which includes a job mode in which the image forming executes a job, and a standby mode in which the image forming apparatus 100 waits for a user command.

The input 110 receives an input of a command to execute a job. To be specific, the input 110 may include a communication interface which may be connected to an external print control apparatus 200 to receive a job execute command therefrom, and a user interface which may receive an input of a job execute command directly from a user. The job execute command may include at least one of a scan command, copy command, fax command, and print command.

Further, the input 110 may include a cover sensor to receive an input as to opening/closing status of the cover.

Meanwhile, the communication interface of the input 110 may implement a form that connects to the print control apparatus 20 by local area network (LAN) and the Internet, or a form that connects by universal serial bus (USB) port. The user interface of the input 110 may be implemented to combine a monitor and a keyboard, or as a device such as a touchpad which simultaneously implements both output and input.

Meanwhile, the input 110 according to one embodiment may receive a set value of an accumulative number of job execute commands as added.

Meanwhile, in various embodiments, the input 110 may receive an input of a minimum value and a maximum value of the standby time.

The inputted set value of the accumulative number, and minimum and maximum values of the standby time will be explained in detail below with reference to FIG. 2.

The job performer 120 performs a job according to the job execute command as inputted. To be specific, the job performer 120 may include constitutions such as a print engine unit, a scanning unit, or a fax unit, and perform a job according to the user's job execute command.

Since the print engine unit, the scanning unit and the fax unit are well known, these will not be explained in detail for the sake of brevity.

The controller 130 adjusts the standby time, i.e., the time interval between job completion and entrance into power-save mode, when the inputted job execute command is added while the image forming apparatus 100 operates in a normal mode. The controller 130 then changes the operational mode of the image forming apparatus according to the adjusted standby time. As used herein, the 'standby time' refers to time for the duration of which the standby mode spans since the completion of the job, and this may be expressed as a 'power-save mode entering time'. The controller 130 may include a counter circuit which may count the standby time until the image forming apparatus 100 enters power-save mode.

Meanwhile, in one embodiment, the controller 130 may increase the standby time according to the accumulative number of the job execute commands which are added during operation in normal mode.

The input 110 may receive a set value of the accumulative number of added job execute commands, and the controller 130 may increase the standby time each time the accumulative number of added job execute commands reaches the number that is a multiple of the set value.

Meanwhile, the input 110 may receive the minimum and maximum values of the standby time, and adjust the standby time between the minimum and maximum values.

The operation of adjusting the standby time will be explained in detail below with reference to FIGS. 3 to 7.

Meanwhile, the controller 130 in one embodiment may adjust the standby time according to the number of print pages as instructed by the added job execute command. This will be explained in detail below with reference to FIGS. 8 and 9.

When changed to power-save mode, the controller 130 may achieve power-saving purpose by cutting off power supply to a module in need of power save of the image forming apparatus 100 or reducing clock speed.

Meanwhile, the controller 130 may set the minimum value to an initial value of the standby mode, when the image forming apparatus 100 changes from the power-save mode to normal mode.

The controller 130 may control the overall constitution of the image forming apparatus 100.

The storage 140 of the image forming apparatus 100 may be implemented as an internal or external storage medium, including, for example, a removable disk including a universal serial bus (USB) memory, or a web server via the network. Although there is only one storage 140 illustrated and explained in the embodiments as described herein, depending on embodiments, the storage 140 may be implemented as a memory set to store data, or a memory set to process command languages.

Meanwhile, the storage 140 may store the set value of the accumulative number of user's job execute commands, and the minimum and maximum values of the standby time. Further, the storage 140 may temporarily store a job execute command and print data inputted via the input 110.

According to various embodiments, the image forming apparatus 100 enables efficient management of power consumption and enhanced user convenience, by variably applying the power-save mode entering time according to the use of the printer by the user.

Figure 2:
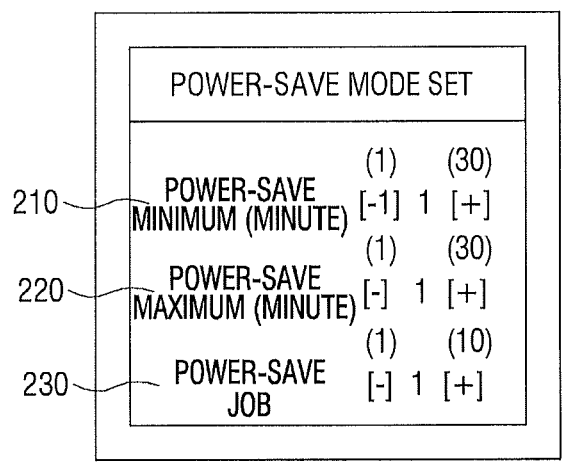
FIG. 2 is a view provided to explain a user interface (UI) to set power-save mode according to an embodiment.

FIG. 2 is a view provided to explain a power-save mode setting user interface (UI) according to an embodiment.

Referring to FIG. 2, the power-save mode UI 200 may display a minimum standby time 210, a maximum standby time 220, and a set value of accumulative number of added job execute commands 230 (or power-save job set value) and receive a user input.

When the minimum standby time 210, the maximum standby time 220 and the power-save job set value are inputted, the values may be stored at the storage 140.

The minimum standby time 210 may be set as an initial value of the standby time when the image forming apparatus 100 initially boots up or when the image forming apparatus 100 changes from the power-save mode to normal mode.

The maximum standby time 220 may be set to a limit value of the standby time, so that the standby time does not exceed the maximum value 220 when the standby time is increased by the controller 130.

Meanwhile, the power-save job set value 230 is comparable with the accumulative number of job execute commands. That is, the standby time may be increased each time the accumulative number reaches a multiple value of the power-save job set value 230. For example, it is assumed that the power-save job set value 230 is '3'. When the accumulative number of job execute commands reaches '3', the standby time increases by +1 min. The standby time increases by +2, when the accumulative number of job execute commands is '7'.

The above operation is performed to adjust the standby time, in consideration of the fact that the possibility of performing the job increases, as the user's job execute commands increase. Accordingly, efficient management of power is provided.

The operation of adjusting standby time will be explained in detail below with reference to FIGS. 3 to 7.

FIGS. 3 to 7 are timing views provided to explain an operation of adjusting standby time according to the job execute command as added, according to an embodiment.

Figure 3:
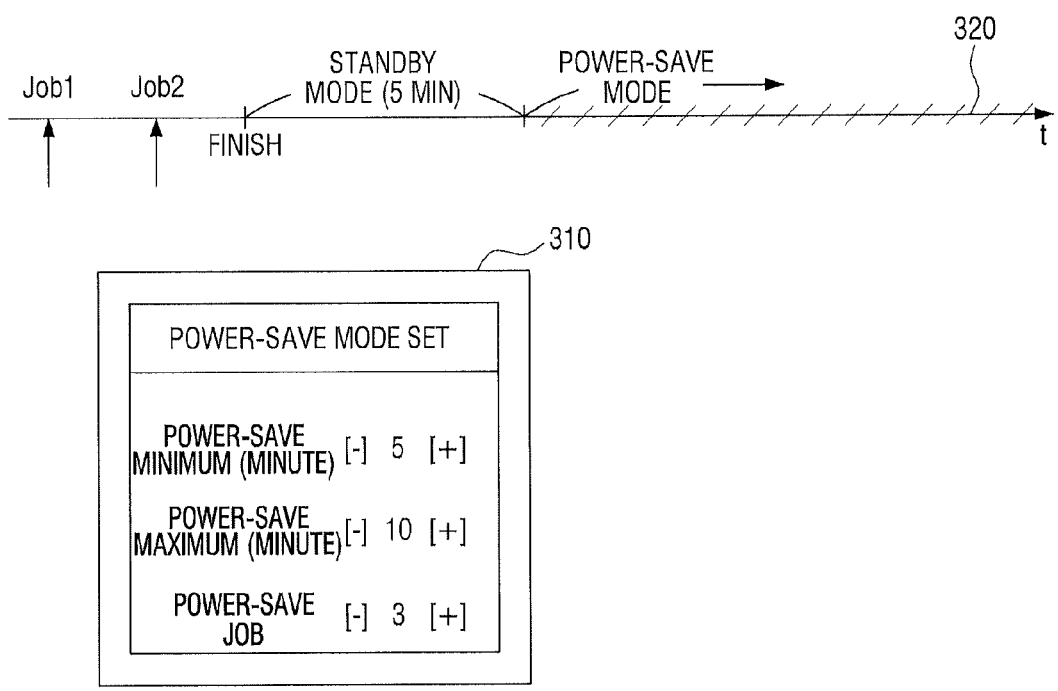
FIGS. 3 to 7 are timing views provided to explain an operation of adjusting standby time according to an additional command to execute a job, according to an embodiment.

Referring to FIG. 3, when the job execute commands (Job1, Job2) are inputted, executed and completed, the image forming apparatus 100 enters standby mode. The 'standby mode' as used herein refers to an operational mode in which the apparatus 100 stands by for the input of a user's job execute command, and in this mode, the electricity same as in the job execute mode may be supplied to the respective units of the image forming apparatus.

Meanwhile, the initial standby time value may be 5 min as set at the power-save mode setting UI 310.

After the standby time (i.e., 5 min) elapses, the image forming apparatus 100 enters power-save mode 320.

The standby time is not adjusted in an example illustrated in FIG. 3, because the accumulative number (i.e., 2) of job execute commands is less than a multiple number of the power-save job set value (or set value of accumulative number of job execute commands) which is '3'.

Figure 4:
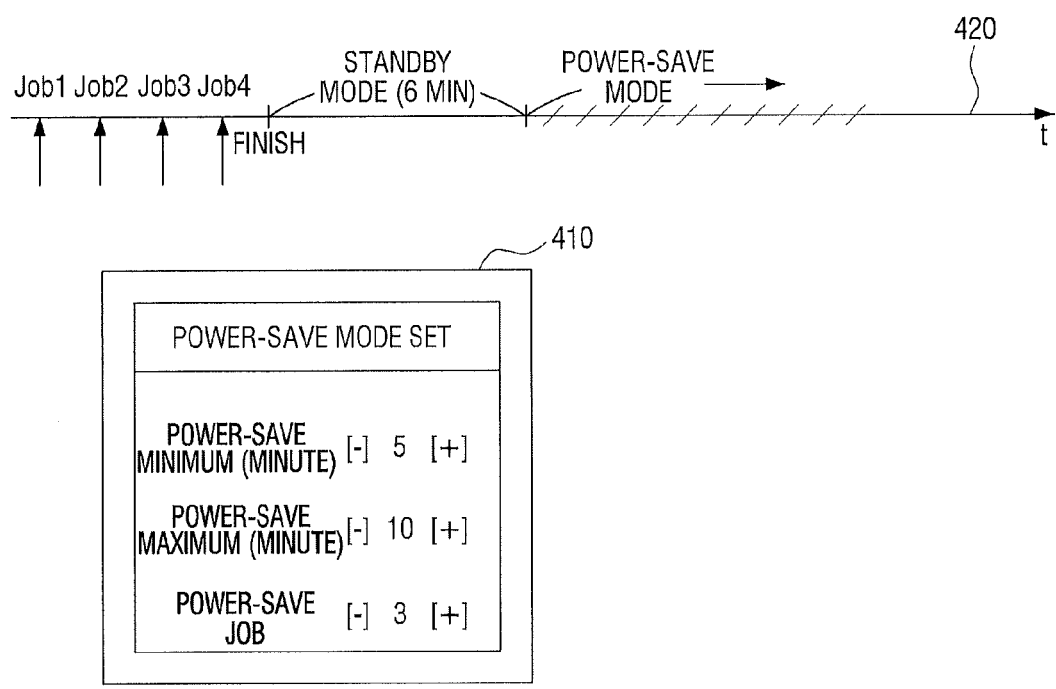

Referring to FIG. 4, however, as the job execute commands Job1, Job2, Job3, Job4 are inputted, the accumulative number of job execute commands (i.e., 4) exceeds the multiple of the power-save job set value (i.e., 3). Accordingly, the standby time increases. Since the accumulative number (i.e., 4) of the job execute commands exceeds one multiple of the power-save job set value (i.e., 3), the standby time increases by +1 min.

Meanwhile, the initial standby time value is 5 min as set at the power-save mode setting UI 410.

Although the standby time is explained as being increased by +1 according to multiple of the set value, the increase of the standby time may be differently set depending on users or manufacturers.

Figure 5:
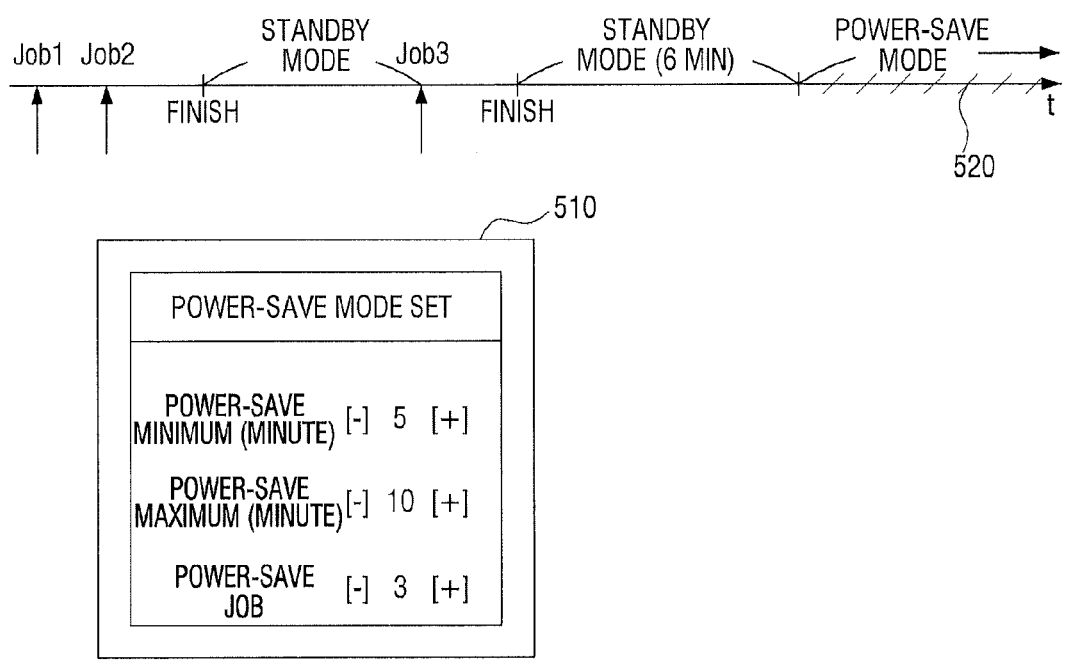

FIG. 5 is provided to explain an example in which a job execute command is inputted in standby mode.

Referring to FIG. 5, job execute commands Job1, Job2 are inputted, executed and completed, and the image forming apparatus 100 enters standby mode.

When the user's job execute command Job3 is inputted during standby mode, a job corresponding to Job3 is executed and the operation returns to the standby mode.

Since the accumulative number of job execute commands is total 3, the standby time increases by +1 min and thus becomes 6 min. That is, the accumulative number of job execute commands may include not only the job execute commands as accumulated during the job execution, but also the job execute commands as added before the operation enters the power-save mode.

Figure 6:
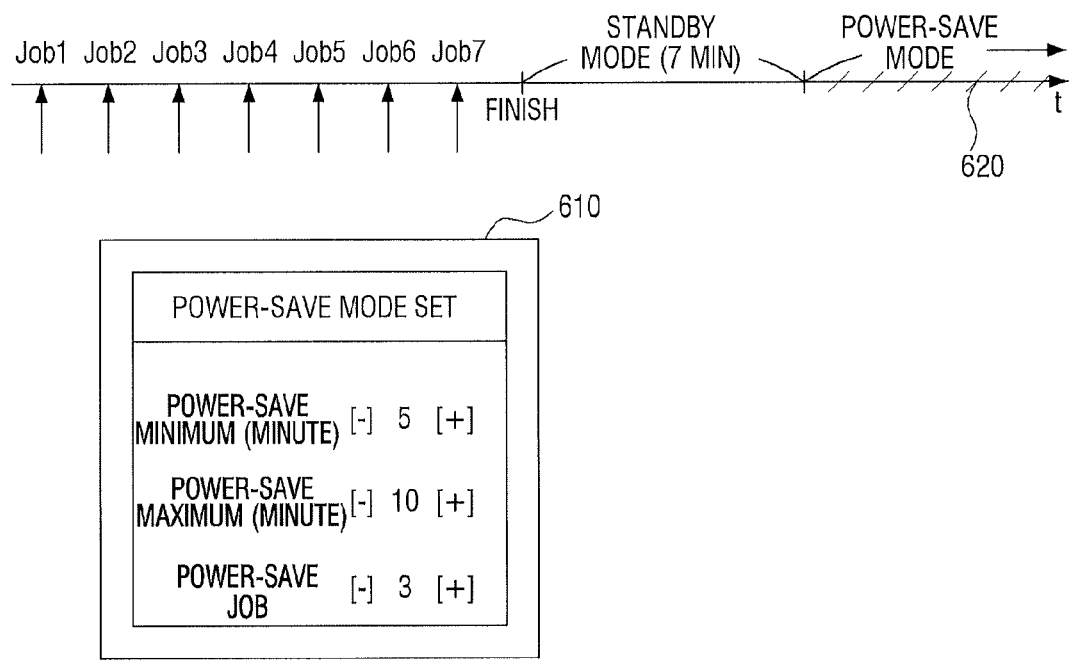

FIG. 6 illustrates an example in which the accumulative number of job execute commands reaches two multiples of the power-save job set value.

Referring to FIG. 6, the minimum value of the standby time is 5 min and the power-save job set value is 3, as inputted at the power-save mode setting UI 610.

Since total seven job execute commands (Job1 to Job7) are accumulated at the image forming apparatus 100, the accumulative number (7) of job execute commands corresponds to two multiples of the power-save job set value (3). Accordingly, the standby time is two times greater than +1, and thus increases by +2 from the initial value of the standby time (i.e., minimum value of 5 min). As a result, the standby time may be adjusted to total 7 min.

Figure 7:
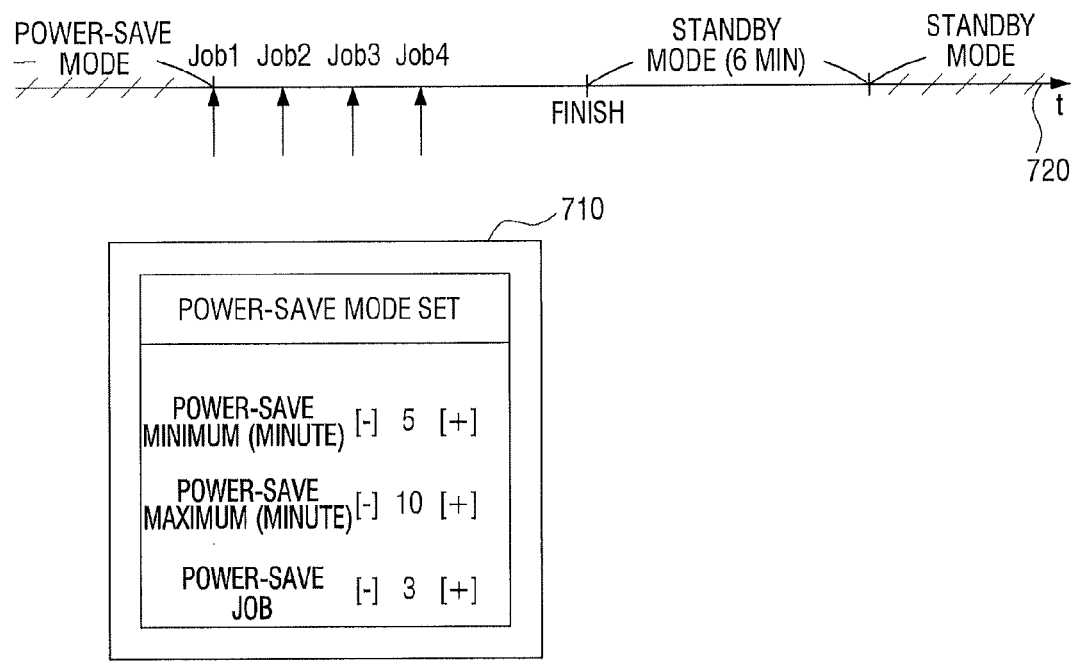

FIG. 7 is a view provided to explain an example in which the operation changes from power-save mode to normal mode.

Referring to FIG. 7, when a job execute command (Job1) is inputted to the image forming apparatus 100 in power-save mode, the image forming apparatus 100 wakes up and performs a job corresponding to the job execute command (Job1).

As explained above, the accumulative number (i.e., 4) of the added job execute commands is compared with the power-save job set value (i.e., 3), and the standby time may be adjusted. Since the accumulative number (4) of job execute commands is one multiple of the power-save job set value (3), the standby time is increased by +1.

As explained above, the image forming apparatus according to various embodiments may increase the standby time when the job is repeatedly executed, to thus increase efficiency in managing power consumption.

Figure 8:
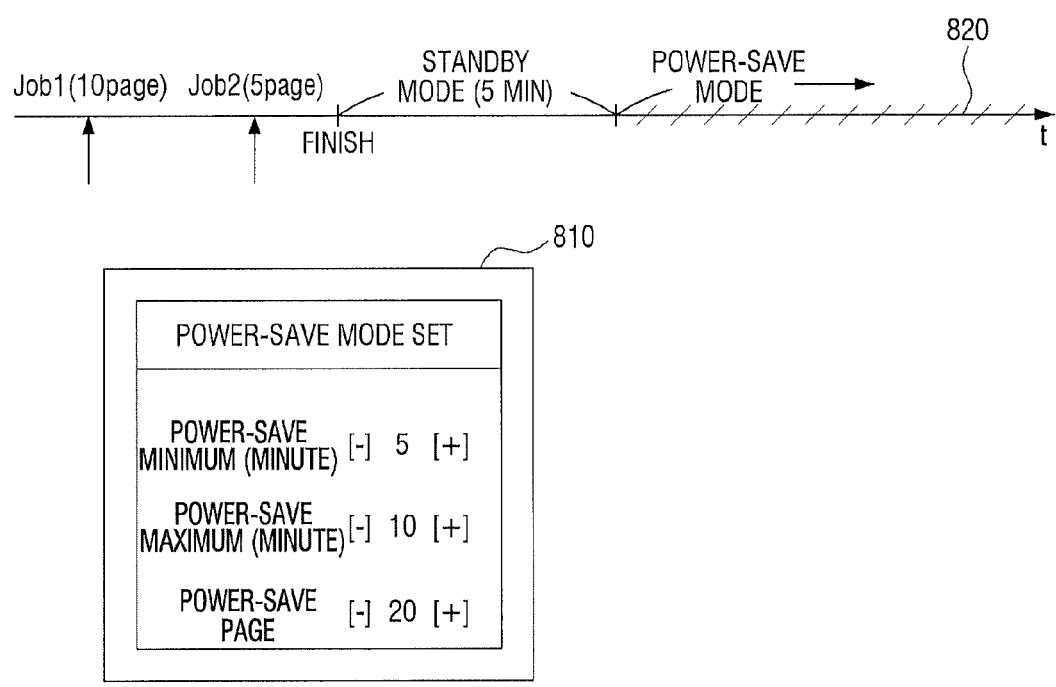
FIGS. 8 and 9 are timing views provided to explain an operation of adjusting standby time according to an accumulatively counted number of print pages, according to an embodiment.
Figure 9:
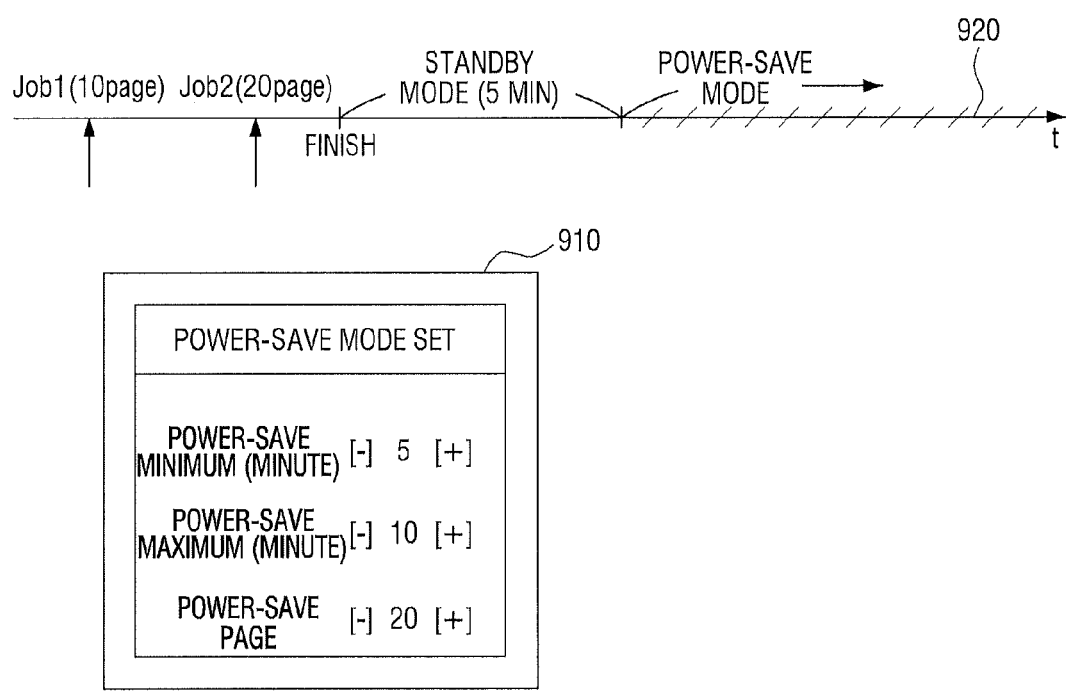

FIGS. 8 and 9 are timing views provided to explain an operation of adjusting standby time according to a number of printed pages, according to an embodiment. Although the standby time is adjusted according to the accumulative number of job execute commands in the examples illustrated in FIGS. 3 to 7, the standby time may also be adjusted according to accumulative number of printed pages as illustrated in and described below with reference to FIGS. 8 and 9.

Referring to FIG. 8, as in the examples illustrated in FIGS. 3 to 7, the minimum and maximum values of the standby time are set at the power-save mode setting UI 810. However, referring to FIG. 8, a power-save page set value is inputted instead of power-save job set value. The power-save page set value is inputted as 20 pages.

Referring to FIG. 8, job execute commands (Job1, Job2) are inputted to the image forming apparatus, and the accumulative number of printed pages is 15 pages. Accordingly, since the printed pages are less than the power-save page set value (i.e., 20 pages), standby time is not adjusted, but maintained at the initial value (i.e., 5 min).

Meanwhile, the values inputted to the power-save mode setting UI is same in both FIGS. 8 and 9. However, the accumulative number of printed pages as inputted to the image forming apparatus 100 is 30 pages, which corresponds to one multiple of the power-save page set value (i.e., 20 pages). Accordingly, the standby time is increased by +1 to be total 6 min.

As explained above, in another embodiments, since the image forming apparatus 100 may increase the standby time as the number of printed pages increases, efficiency in the management of power consumption is provided.

Figure 10:
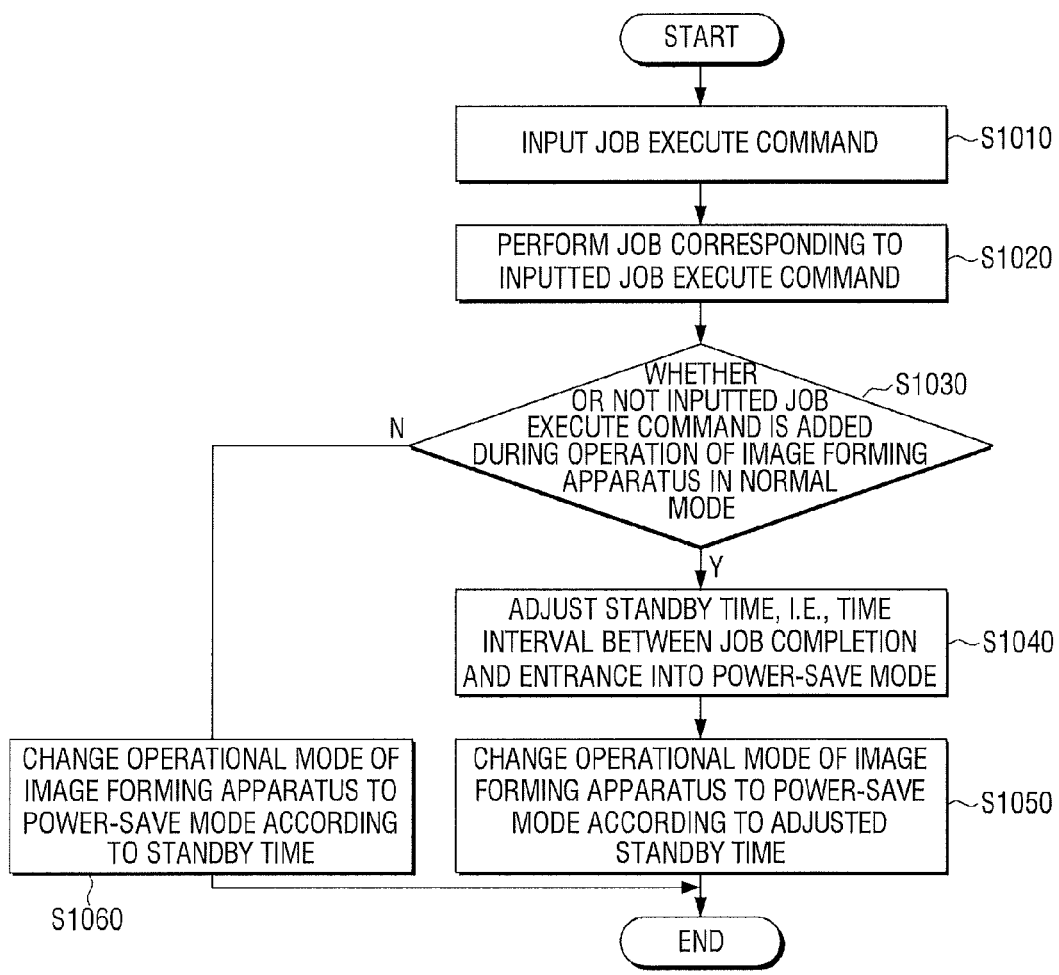
FIG. 10 is a flowchart provided to explain a control method of an image forming apparatus according to an embodiment.

FIG. 10 is a flowchart provided to explain a control method of an image forming apparatus 100 according to an embodiment.

To be specific, the operation of adjusting standby time of the image forming apparatus 100 that supports power-save mode function, will be explained below.

The 'power-save mode' as used herein refers to an operational mode to prevent unnecessary consumption of electricity by cutting off power supply to a module in need of power save of the image forming apparatus 100 or reducing clock speed, when the image forming apparatus is not used for a predetermined time.

Meanwhile, the operational mode of the image forming apparatus 100 other than power-save mode will be referred to as the normal mode, and the normal mod may include a job mode which performs print job and a standby mode which stands by for print job.

Figure 11:
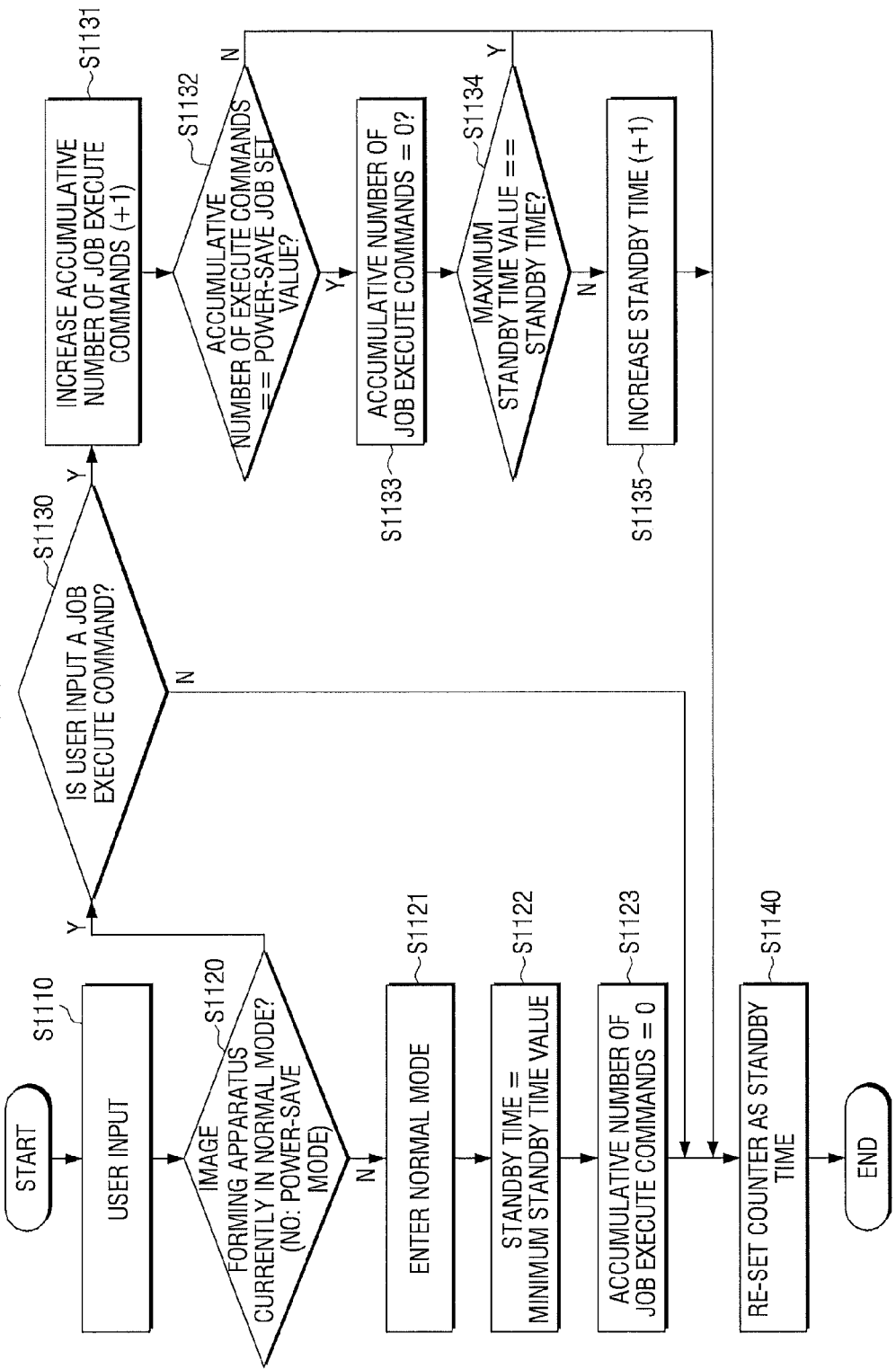
FIG. 11 is a flowchart provided to explain a control method of an image forming apparatus according to an embodiment.

Referring to FIG. 11, the image forming apparatus 100 receives a job execute command at S1010, and performs the job corresponding to the inputted job execute command at S1020.

The job execute command may include at least one of a scan command, copy command, fax command, and print command.

At S1030, when the inputted job execute command is added while the image forming apparatus 100 is operated in normal mode, at S1040, the standby time, which is the time interval between job completion and entrance into power-save mode, is adjusted.

The adjustment of the standby time may include increase of standby time according to the accumulative number of job execute commands added during operation of the image forming apparatus 100 in normal mode.

In the above example, a step for inputting a set value of accumulative number of added job execute commands may be additionally implemented, according to which the standby time may be increased each time the accumulative number of the added job execute commands reaches a multiple of the set value.

Meanwhile, the image forming apparatus 100 may additionally include a step of inputting a minimum value and a maximum value of the standby time, and may adjust the standby time between the minimum and maximum values as inputted.

Meanwhile, the image forming apparatus 100 may adjust the standby time according to the number of pages which are printed according to the added job execute commands.

At S1050, the operational mode of the image forming apparatus 100 may change to power-save mode according to the adjusted standby time, after the standby time is adjusted.

Meanwhile, when the image forming apparatus 100 changes from the power-save mode to normal mode, the minimum value may be set as an initial value of the standby time. The image forming apparatus 100 is changed to normal mode and used when there is user input in the power-save mode.

Meanwhile, the control method of the image forming apparatus as illustrated in FIG. 10 may be implemented in the image forming apparatus 100 as constructed as illustrated in FIG. 1, or in other image forming apparatuses with different constitutions.

FIG. 11 is a flowchart provided to explain a control method of the image forming apparatus 100 according to an embodiment. To be specific, FIG. 11 is a flowchart illustrating the control method of the image forming apparatus 100 of FIG. 10 in greater detail.

Referring to FIG. 11, at S1110, in response to a user input to the image forming apparatus 100, at S1120, it is determined whether the image forming apparatus 100 is currently in normal mode or not. The user input may include an input of job execute command, opening/closing of a cover, or a manipulation on a user interface of the input 110.

At S1120, when the image forming apparatus 100 is currently in power-save mode, at S1121, the image forming apparatus 100 is changed from the power-save mode to normal mode. At S1122, the minimum value of the standby time (or minimum power-save mode entering time) inputted to the power-save mode setting UI is set as an initial value of the standby time, and at S1123, the accumulative number of job execute commands is initialized to 0. The above process relates to the process of changing from power-save mode to normal mode in response to the user input, and the operation to initialize the standby time and accumulative number of job execute commands may be initialized concurrently with the above process. At S1140, a counter is operated to count the standby time, and the entrance into power-save mode is controlled.

In one embodiment, input of a job execute command is used for the adjustment of standby time, in which case types of input are determined. That is, at S1120:YES, when the image forming apparatus 100 is currently in normal mode, and, at S1130:YES, when the user input is a job execute command, at S1131 to S1135, the process of adjusting standby time may be performed.

On the contrary, at S1120:YES, when the image forming apparatus 100 is currently in normal mode, but at S1120:NO, when the user input is other than a job execute command, such as opening/closing of the cover or manipulation on the user interface of the input 100, at S1140, the counter to count the standby time may be operated and entrance into power-save mode may be controlled.

The process of adjusting standby time (S1131 to S1135) is described in further detail below. First, at S1131, the image forming apparatus 100 increases the accumulative number of job execute commands, and at S1132:YES, when the accumulative number of job execute commands matches the power-save job set value, at S1133, the accumulative number of job execute commands is initialized to 0. It is also determined if the standby time matches the maximum standby time value, and if not (at S1134:NO), at S1135, the standby time is adjusted to be increased by +1 min.

At S1132:NO, when the accumulative number of job execute commands does not match the power-save job set value, operations at S1133 to S1135 may be skipped.

Meanwhile, at S1134:NO, when the standby time matches the maximum standby time value, the standby time may not be increased.

In one embodiment, the operations at S1131 to S1135 may include increasing accumulative number of job execute commands when job execute command is added, determining if a multiple of the power-save job set value is reached, and increasing the standby time within the preset maximum standby time value.

Meanwhile, the control method of the image forming apparatus as the one illustrated in FIG. 11 may be implemented in the image forming apparatus 100 constructed as illustrated in FIG. 1, or other image forming apparatuses with different constitutions.

As explained above, according to various embodiments, the control method of the image forming apparatus 100 provides both efficient power consumption management and increased user convenience, by variably adjusting the time until entrance into power-save mode (or standby time) according to a use by a user.

Meanwhile, the method according to various embodiments may be programmed and stored on various storage media. Accordingly, methods according to the above various embodiments may be implemented on various types of electronic devices which execute storage media.

The control method according to various embodiments may also be implemented as programs including executable algorithms, and such programs may be stored and provided on non-transitory computer readable medium.

The non-transitory computer readable medium as used herein refers to a medium which semi-permanently stores data and which is readable by a device, rather than a medium such as register, cache, or memory which stores data for a relatively short period of time. To be specific, the various applications or programs ay be stored and provided on the non-transitory computer readable medium such as CD, DVD, hard disk, Blu-ray disk, USB, memory card, or ROM.

Further, the foregoing exemplary embodiments and advantages are merely exemplary and are not to be construed as limiting the present disclosure. The present disclosure can be readily applied to other types of apparatuses. Also, the description of the exemplary embodiments of the present inventive concept is intended to be illustrative, and not to limit the scope of the claims.

What is claimed is:

1. A control method of an image forming apparatus having a normal mode and a power-save mode, the control method comprising:
   inputting a job execute command;
   performing a job according to the inputted job execute command;
   adjusting a standby time, when the inputted job execute command is added during operation in the normal mode, the standby time being time interval between completion of the job and entrance into power-save mode; and
   changing the operational mode of the image forming apparatus to the power-save mode according to the adjusted standby time.

2. The control method of claim 1, wherein the adjusting comprises increasing the standby time according to an accumulative number of job execute commands which are added during operation of the image forming apparatus in the normal mode.

3. The control method of claim 2, further comprising inputting a set value of the accumulative number of job execute commands as added, wherein
   the adjusting comprises increasing the standby time each time the accumulative number of job execute commands as added reaches a multiple of the set value.

4. The control method of claim 1, further comprising inputting a minimum value and a maximum value of the standby time, wherein
   the adjusting comprises adjusting the standby time between the minimum value and the maximum value.

5. The control method of claim 4, further comprising setting the minimum value as an initial value of the standby time, when the image forming apparatus changes from the power-save mode to the normal mode.

6. The control method of claim 1, wherein the adjusting comprises adjusting the standby time according to a number of pages printed according to the job execute command as added.

7. The control method of claim 1, wherein the normal mode comprises an operational mode to perform a print job and a standby mode to stand by for the print job.

8. The control method of claim 1, wherein the job execute command comprises at least one of a scan command, a copy command, a fax command and a print command.

9. The control method of claim 1, wherein the power-save mode comprises saving power by cutting off power supply to a module in need of power save, or reducing clock speed of the module in need of power save.

10. An image forming apparatus having a normal mode and a power-save mode, the image forming apparatus comprising:
   an input which receives an input of a job execute command;
   a job performer which performs a job according to the inputted job execute command; and
   a controller which adjusts a standby time, when the inputted job execute command is added during operation in the normal mode, the standby time being time interval between completion of the job and entrance into power-save mode, wherein
   the controller changes the operational mode of the image forming apparatus to the power-save mode according to the adjusted standby time.

11. The image forming apparatus of claim 10, wherein the controller increases the standby time according to an accumulative number of job execute commands which are added during operation of the image forming apparatus in the normal mode.

12. The image forming apparatus of claim 11, wherein the input receives an input of a set value of the accumulative number of job execute commands as added, and
   the controller increases the standby time each time the accumulative number of job execute commands as added reaches a multiple of the set value.

13. The image forming apparatus of claim 10, wherein the input receives an input of a minimum value and a maximum value of the standby time, and
   the controller adjusts the standby time between the minimum value and the maximum value.

14. The image forming apparatus of claim 13, wherein the controller sets the minimum value as an initial value of the standby time, when the image forming apparatus changes from the power-save mode to the normal mode.

15. The image forming apparatus of claim 10, wherein the controller adjusts the standby time according to a number of pages printed according to the job execute command as added.

16. The image forming apparatus of claim 10, wherein the normal mode comprises an operational mode to perform a print job and a standby mode to stand by for the print job.

17. The image forming apparatus of claim 10, wherein the job execute command comprises at least one of a scan command, a copy command, a fax command and a print command.

18. The image forming apparatus of claim 10, wherein the controller saves power by cutting off power supply to a module in need of power save, or reducing clock speed of the module in need of power save, when the operation changes to the power-save mode.

19. A non-transitory computer-readable recording medium comprising a program to implement a control method of an image forming apparatus having a normal mode and a power-save mode, the control method comprising:
   inputting a job execute command;
   performing a job according to the inputted job execute command;
   adjusting a standby time, when the inputted job execute command is added during operation in the normal mode, the standby time being time interval between completion of the job and entrance into power-save mode; and
   changing the operational mode of the image forming apparatus to the power-save mode according to the adjusted standby time.

20. A control method of an image forming apparatus having a normal mode and a power-save mode, the control method comprising:
   receiving at least one job execute command;
   performing at least one job execute command;
   adjusting the standby time, wherein standby time being time interval between completion of the job and entrance into power-save mode;
   changing the operational mode of the image forming apparatus to the power-save mode according to the adjusted standby time;
   wherein the adjusting of the standby time occurs when the total number of jobs executed exceed a predetermined value and/or when the combined total number of pages printed between the jobs executed exceed a predetermined value.

* * * * *